（12）United States Patent
So

(10) Patent No.: US 8,786,446 B2
(45) Date of Patent: Jul. 22, 2014

(54) POSITION TRACKING APPARATUS FOR TRAINING ANIMAL

(75) Inventor: Min Jae So, Seoul (KR)

(73) Assignee: Dogtra Co., Ltd. (KR)

( * ) Notice: Subject to any disclaimer, the term of this patent is extended or adjusted under 35 U.S.C. 154(b) by 242 days.

(21) Appl. No.: 13/492,021

(22) Filed: Jun. 8, 2012

(65) Prior Publication Data

US 2013/0265165 A1    Oct. 10, 2013

(30) Foreign Application Priority Data

Apr. 10, 2012  (KR) .......................... 10-2012-0037349

(51) Int. Cl.
  G08B 23/00    (2006.01)
  A01K 15/02    (2006.01)
  A01K 27/00    (2006.01)

(52) U.S. Cl.
  CPC ............. *A01K 15/023* (2013.01); *A01K 27/009* (2013.01); *A01K 15/021* (2013.01); *A01K 15/022* (2013.01)
  USPC ....................................... 340/573.3; 119/712

(58) Field of Classification Search
  CPC . A01K 15/023; A01K 15/021; A01K 15/022; A01K 27/009
  USPC ......................................................... 340/573.3
  See application file for complete search history.

(56) References Cited

U.S. PATENT DOCUMENTS

| 5,857,433 A * | 1/1999 | Files ............................. 119/720 |
| 2009/0102668 A1* | 4/2009 | Thompson et al. ........ 340/573.3 |
| 2009/0139462 A1* | 6/2009 | So ................................. 119/719 |

* cited by examiner

Primary Examiner — Kerri McNally
(74) Attorney, Agent, or Firm — Cantor Colburn LLP

(57) ABSTRACT

Disclosed is a position tracking apparatus for training an animal. When transmission data including an identification code of a training device is transmitted to a GPS device after the GPS device and the training device are attached to an animal, the GPS device receives the transmission data of the training device and transfers the received transmission data to the training device. Accordingly, it is possible to train the animal to desirably act through an operation of the training device attached to the animal even though the animal is far away from the master when the animal acts with undesirable behavior.

5 Claims, 4 Drawing Sheets

PORTABLE DEVICE 200           300
(GPS DEVICE)  (TRAINING DEVICE)

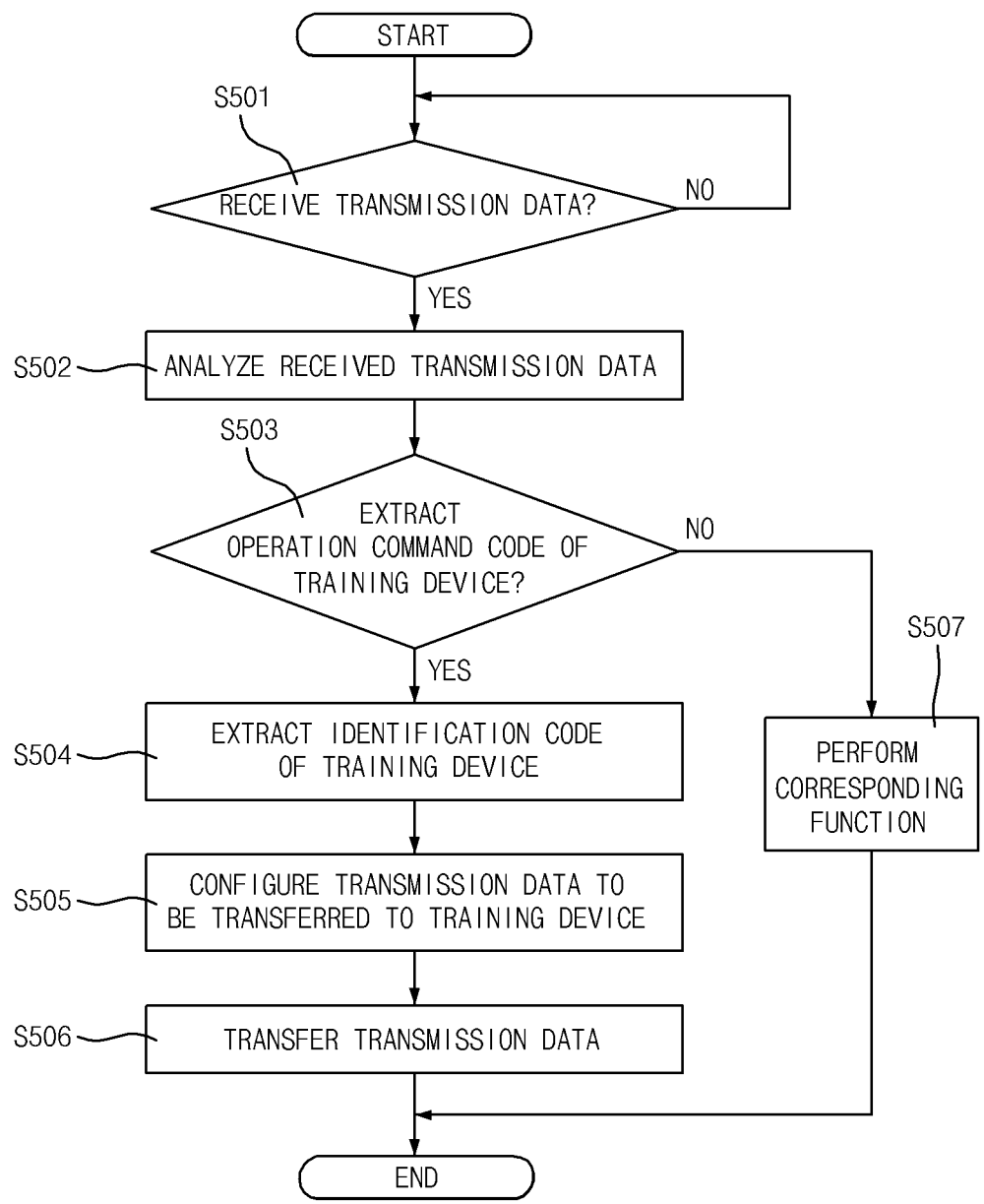

POSITION TRACKING APPARATUS FOR TRAINING ANIMAL

BACKGROUND OF THE INVENTION

1. Field of the Invention

The present invention relates to a position tracking apparatus for training an animal, and more particularly to a position tracking apparatus for training an animal, which receives transmission data for training the animal to act in a desirable manner by applying a vibration or an electrical stimulation to the animal through a GPS device attached to the animal.

2. Description of the Prior Art

Recently, with the improvement of the quality of life, the number of homes considering animals such as a dog, a cat and the like as a family member is continuously increased and thus pet related businesses are steadily increased.

Accordingly, various animal products having good quality such as a dye and a leash or a collar connected to an animal's body as well as food for animals are released. Further, a GPS device for grasping a position of the animal released in a wide spread area of a prairie or a park is launched.

The GPS device includes a GPS receiver attached to the animal to grasp the position of the animal, and a GPS handheld carried by a user. The GPS handheld receives position information on the animal collected through a GPS satellite from the GPS receiver and displays the position of the animal, so that the user can easily grasp the position of the animal.

While a master can grasp the position of the animal through the GPS receiver attached to the animal when the master takes the animal for a walk, the master experiences inconvenience when the animal injures other people by acting in an undesirable manner such as barking since there is no method of controlling the animal.

Accordingly, it is required to provide an apparatus which can grasp the position of the animal released in a wide spread area of a prairie or a park and train the animal to recognize its undesirable behavior and to act in a desirable manner by applying an electrical stimulation or a vibration to the animal when the animal acts in an undesirable manner such as barking.

SUMMARY OF THE INVENTION

Accordingly, the present invention has been made to solve the above-mentioned problem, and an aspect of the present invention is to provide a position tracking apparatus for training an animal, which can grasp a position of the animal through a GPS device and, when the animal acts with undesirable behavior, train the animal to act desirably by applying an electrical stimulation or a vibration to the animal.

Further, another aspect of the present invention is to provide a position tracking apparatus for training an animal, which can train the animal to recognize its undesirable behavior and to act desirably by applying an electrical stimulation or a vibration to the animal through the GPS device attached to the animal even though the animal is far away from the master.

In accordance with an aspect of the present invention, there is provided a position tracking apparatus for training an animal, the position tracking apparatus including a portable device for generating and transferring transmission data containing a vibration or an electrical stimulation intensity command code, a vibration or an electrical stimulation generating command code, and a code for requesting position information on an animal; a GPS device for extracting the vibration or the electrical stimulation intensity command code and the vibration or the electrical stimulation generating command code from the transmission data received from the portable device, and generating and transferring transmission data containing an identification code of a training device, the GPS device being attached to a collar connected to a body of the animal; and the training device for receiving the vibration or the electrical stimulation intensity command code and the vibration or the electrical stimulation generating command code from the GPS device through the transmission data, and generating a vibration or an electrical stimulation having an intensity according to a corresponding command, the training device being attached to the collar connected to the body of the animal and being located adjacent to the GPS device.

The portable device may include a key input unit including a vibration generating key for generating the vibration, an electrical stimulation generating key for generating the electrical stimulation, an intensity adjusting key for adjusting an intensity of the vibration or the electrical stimulation, and a GPS function controlling key for requesting position information of the animal; a portable device storage unit for storing a vibration generating command code according to an input of the vibration generating key, an electrical stimulation generating command code according to an input of the electrical stimulation generating key, a vibration or an electrical stimulation intensity command code according to an input of the intensity adjusting key, a position information requesting code according to an input of the GPS function controlling key, and a device identification code; a portable device controller for extracting a vibration or an electrical stimulation intensity command code, a vibration or an electrical stimulation command code, and a position information requesting code corresponding to a key input from the key input unit, extracting an identification code of the GPS device, and generating transmission data; and a wireless portable device transceiver for transmitting the transmission data generated through the portable device controller, and receiving transmission data containing position information of the animal.

The portable device may further include a portable device GPS module for performing communication with a GPS satellite and receiving coordinate data according to a position at regular intervals; and a display unit for displaying whether the vibration generating key or the electrical stimulation generating key is input and a size of an intensity input through the intensity adjusting key, and displaying distance information from the animal as a table and a map, wherein the portable device controller generates the distance information from the animal as the table and the map by using the position information of the animal received through the portable device wireless portable device transceiver and the coordinate data received from the portable device GPS module.

The GPS device includes a GPS module for performing communication with a GPS satellite and receiving coordinate data according to a position at regular intervals; a wireless transceiver for receiving transmission data containing an intensity command code, a vibration or an electrical stimulation generating command code, and a position information requesting code, transmitting transmission data containing an intensity command code and a vibration or an electrical stimulation generating command code or transmission data containing position information according to the coordinate data; a GPS device storage unit for storing an identification code of the portable device, an identification code of the GPS device, and an identification code of the training device; a signal converter for extracting the intensity command code, the vibration or the electrical stimulation generating command code from the received transmission data, and generating transmission data containing the identification code of the training device; and a controller for controlling such that the coordinate data is transferred from the GPS module, the transmission data containing the position information is generated, and the generated transmission data is transferred to the portable device, and controlling the signal converter such that transmission data for an operation control of the training device is generated and transferred through the signal converter.

The training device includes a vibration generator for generating a vibration, the vibration generator being in contact with the body of the animal; an electrical stimulation generator for generating an electrical stimulation, the electrical stimulation generator being in contact with the body of the animal; a wireless receiver for receiving the transmission data; an LED output unit for turning on/off an LED according to whether the vibration generator or the electrical stimulation generator is operated; and a training device controller for controlling the vibration generator and the electrical stimulation generator such that a vibration or an electrical stimulation having an intensity according to a corresponding command is generated by analyzing the transmission data.

BRIEF DESCRIPTION OF THE DRAWINGS

FIG. 5 is a flowchart illustrating a process in which the position tracking apparatus for training the animal transfers transmission data for controlling a behavior of the animal to a training device through a GPS device according to embodiments of the present invention.

DETAILED DESCRIPTION OF THE EXEMPLARY EMBODIMENTS

Hereinafter, exemplary embodiments of the present invention will be described with reference to accompanying drawings in detail in order to those skilled in the art to easily implement the present invention.

Figure 1:
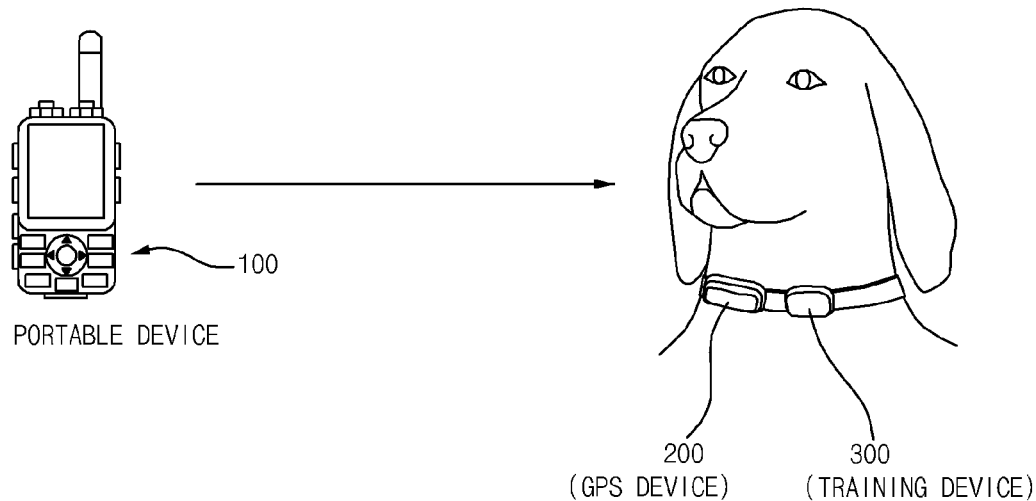
FIG. 1 is a perspective view of a position tracking apparatus for training an animal according to embodiments of the present invention.

FIG. 1 is a perspective view of a position tracking apparatus for training an animal according to embodiments of the present invention.

As shown in FIG. 1, the position tracking apparatus for training the animal includes a portable device 100 for wirelessly transferring transmission data for controlling a GPS device 200 which is an apparatus attached to an animal's body while grasping a position of the animal in order to easily control a behavior of the animal and an operation of a training device 300, and displaying the position of the animal according to position information on the animal transferred from the GPS device 200, the GPS device 200 being attached to the animal's body for transferring position information on the animal from a GPS satellite, transferring the position information to the portable device 100, extracting a code for controlling the operation of the training device 300 from the transmission data received from the portable device 100, and transferring the extracted code to the training device 300, and the training device 300 attached to the animal's body for generating a vibration or an electrical stimulation for controlling a behavior of the animal by using the transmission data obtained through the GPS device 200.

At this time, the GPS device 200 and the training device 300 can be attached to a collar connected to the body of the animal.

Meanwhile, although it is assumed in embodiments of the present invention that a collar including the GPS device 200 and the training device 300 is worn on an animal's neck, it goes without saying that the collar can be connected to any part such as a body or a foot of the animal instead of the neck.

Figure 2:
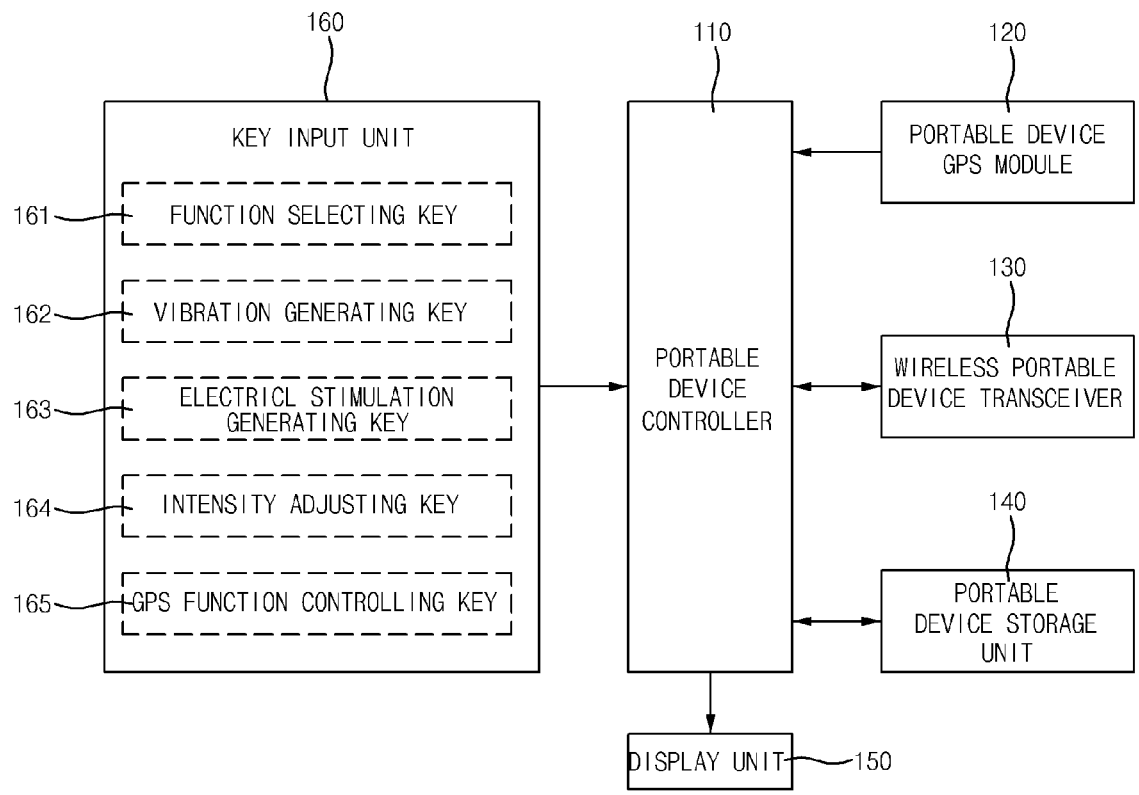
FIG. 2 is a block diagram of an internal construction of a portable device included in the position tracking apparatus for training the animal according to embodiments of the present invention.
Figure 3:
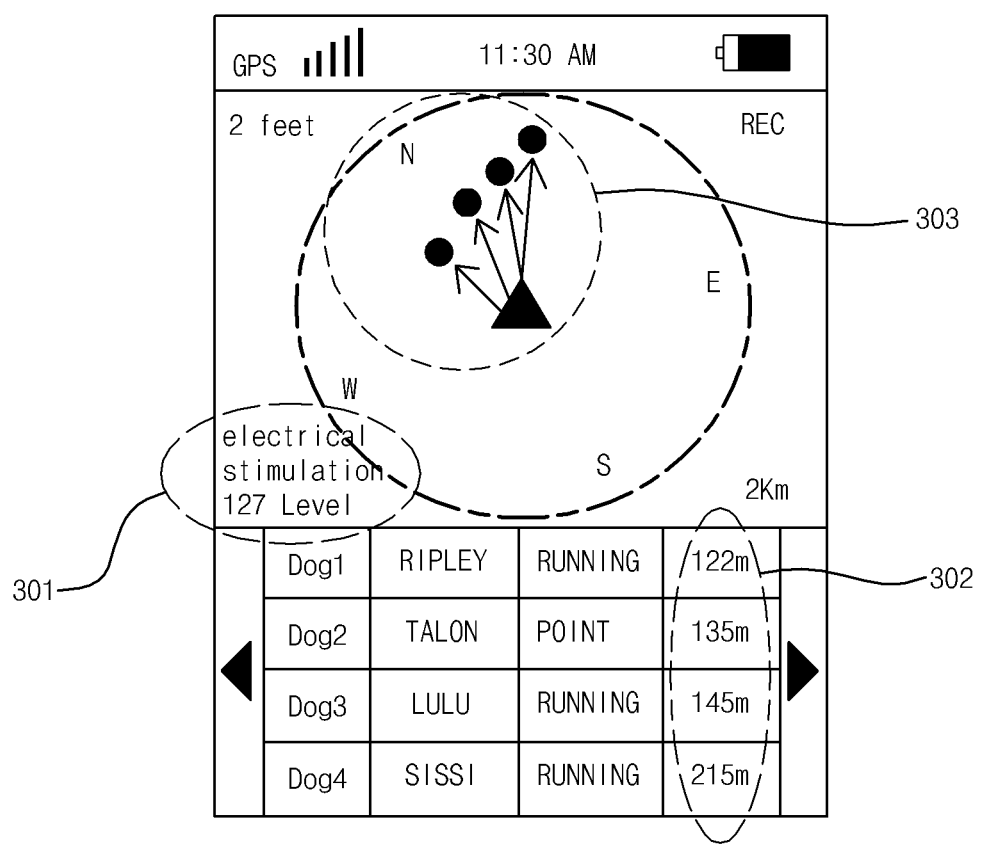
FIG. 3 illustrates an example of a screen displayed in a display unit of the portable device according to embodiments of the present invention.

FIG. 2 is a block diagram of an internal construction of a portable device included in the position tracking apparatus for training the animal according to embodiments of the present invention, and FIG. 3 illustrates an example of a screen displayed in a display unit of the portable device according to embodiments of the present invention.

A portable device GPS module 120 receives coordinate data for a position of the portable device 100 by performing communication with a GPS satellite at regular intervals, and transfers the received coordinate data to a portable device controller 110.

A wireless portable device transceiver 130 receives transmission data containing position information of the GPS device 200 from the GPS device 200 attached to the collar, and transmits transmission data containing a vibration or an electrical stimulation intensity command code, a vibration or an electrical stimulation generating command code, a GPS related code to the GPS device 200.

At this time, the GPS related code may be a code for requesting position information to the GPS device 200 or a code related to a GPS operation such as a code for instructing a position information collection, and the code for requesting position information of the animal will be described as the GPS related code in a detailed description of the present invention.

A portable device storage unit 140 stores an identification code of the portable device 100, and identification codes of the GPS device 200 for performing communication with the portable device 100 and the training device 300.

A display unit 150 displays a position of the animal and an operation of the training device 300.

FIG. 3 illustrates a screen displayed in the display unit 150. The display unit 150 displays a screen showing the operation of the training device 300 as a reference numeral 301, a table showing positions of animals received from the GPS device 200 together with names of the animals, exercise states, figures according to distances from current animals as a reference numeral 302, and current positions of animals based on east, west, south, and north as a reference numeral 303.

Although the detailed description of the present invention describes that the current positions of animals are displayed based on east, west, south, and north as the reference numeral 303, the current positions of animals can be displayed in a map type.

A key input unit 160 includes a function selecting key 161 for selecting a GPS function or a training function, a vibration generating key 162 for generating a vibration in the training device 300, an electrical stimulation generating key 163 for generating an electrical stimulation in the training device 300, an intensity adjusting key 164 for adjusting an intensity of a vibration or an electrical stimulation, and a GPS function controlling key 165 for controlling the GPS device 200 and controlling an operation according to the GPS function.

At this time, the intensity adjusting key 164 may include a volume key.

Further, although embodiments of the present invention describe that the electrical stimulation generating key 163 includes one key, the electrical stimulation generating key 163 may include two keys consisting of a high electrical stimulation generating key and a low electrical stimulation generating key.

The portable device controller 110 controls a general operation of the portable device 100, extracts an intensity command code according to an input of the intensity adjusting key 164 when the intensity adjusting key 164 is input, and extracts a vibration generating command code or an electrical stimulation command code when the vibration generating key 162 or the electrical stimulation generating key 163 is input.

Further, the portable device controller 110 extracts a code for requesting position information of the animal when the GPS function controlling key 165 is input.

Furthermore, the portable device controller 110 extracts an identification code of the portable device 100, generates transmission data by using the extracted intensity command code, vibration or electrical stimulation generating command code, code for requesting position information, and the identification code of the portable device 100, and then transfers the generated transmission data to the GPS device 200.

Meanwhile, since the portable device 100 generates the transmission data containing all of the code for requesting position information to be transferred to the GPS device 200, and the intensity command code and the vibration or the electrical stimulation generating command code to be transferred to the training device 300, the transmission data is transmitted to the GPS device 200 having a larger communication frequency band in comparison with the training device 300 in the present invention.

Figure 4:
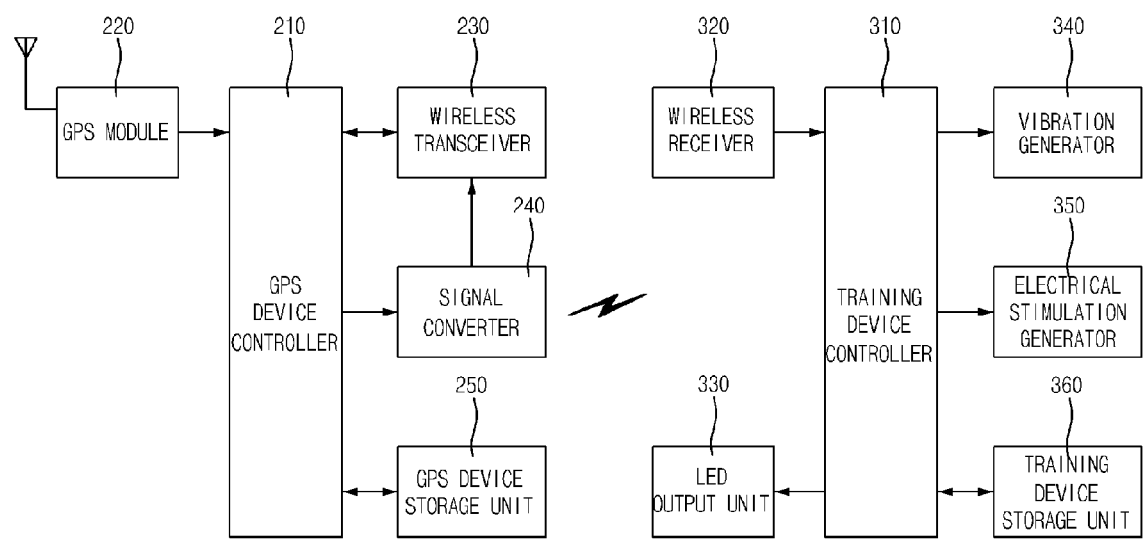
FIG. 4 is a block diagram of an internal construction of a collar included in the position tracking apparatus for training the animal according to embodiments of the present invention.

FIG. 4 is a block diagram of an internal construction of a collar included in the position tracking apparatus for training the animal according to embodiments of the present invention.

The GPS device 200 and the training device 300 are attached to the collar. The GPS device 200 includes a GPS device controller 210, a wireless transceiver 230, a signal converter 240, a GPS device storage unit 250, and a GPS module 220. The training device 300 includes a training device controller 310, a wireless receiver 320, an LED output unit 330, a vibration generator 340, an electrical stimulation generator 350, and a training device storage unit 360.

The description for the GPS device 200 will be given first as follows. The GPS module 220 receives coordinate data for a position of the current GPS device 200, that is, a position of the animal, by performing communication with a GPS satellite at regular intervals, and transfers the received coordinate data to the GPS device controller 210.

The wireless transceiver 230 receives the transmission data containing the intensity command code, the vibration or the electrical stimulation generating command code, and the code for requesting position information from the portable device 100, and transfers the transmission data containing the intensity command code, the vibration or the electrical stimulation generating command code, and the identification code of the training device 300 to the training device 300.

Further, the wireless transceiver 230 transfers the transmission data containing the position information of the GPS device 200 and the identification code of the GPS device 200 or the portable device 100 to the portable device 100.

The signal converter 240 extracts only the intensity command code, and the vibration or the electrical stimulation generating command code corresponding to operation commands of the training device 300 from the transmission data transferred from the portable device 100, and generates transmission data containing an identification code of the training device 300.

In general, since the GPS device 200 uses a communication frequency corresponding to a band of 150 MHz and the training device 300 uses a communication frequency corresponding to a band of 27 MHz, the transmission data containing the intensity command code, the vibration or the electrical stimulation generating command code, and the code for requesting the position information is transferred to the GPS device 200 having a large communication band in the portable device 100. Further, the GPS device 200 generates transmission data containing an intensity command code, and a vibration or an electrical stimulation command code corresponding to the training device 300 and transfers the generated transmission data to the training device 300.

The GPS storage unit 250 stores the identification code of the GPS device 200, the identification code of the portable device 100, and the identification code of the training device 300.

When receiving coordinate data according to a current position from the GPS module 220, the GPS device controller 210 extracts the identification code of the GPS device 200 from the GPS device storage unit 250 and generates transmission data containing position information of the GPS device 200.

Further, GPS device controller 210 transfers the transmission data containing the position information of the GPS device 200 to the portable device 100.

Moreover, when receiving the transmission data from the portable device 100, the GPS device controller 210 analyzes the received transmission data.

At this time, the GPS device controller 210 extracts an intensity command code, and a vibration or an electrical stimulation generating command code according to the operation of the training device 300 from the transmission data, and extracts the identification code of the training device 300 from the GPS device storage unit 250.

The GPS device controller 210 generates transmission data by using the intensity command code, the vibration or the electrical stimulation generating command code, and the identification code of the training device 300.

Further, the GPS device controller 210 transfers the generated transmission data to the training device 300.

The training device 300 includes a training device controller 310, a wireless receiver 320, an LED output unit 33, a vibration generator 340, an electrical stimulation generator 350, and a training device storage unit 360.

The wireless receiver 320 receives the transmission data from the wireless transceiver 230 of the GPS device 200.

The LED output unit 330 turns on an LED when a vibration or an electrical stimulation is generated according to a control of the training device controller 310.

The training device storage unit 360 stores the identification code of the portable device 100 and the identification code of the GPS device 200.

The vibration generator 340 includes a motor connected to the body of the animal to generate a vibration, and generates a vibration of which intensity is adjusted according to a control of the training device controller 310.

The electrical stimulation generator 350 includes a pair of electric shock terminals connected to the body of the animal, and adjusts an intensity of electricity (voltage or current) flowing through the electric shock terminals according to the control of the training device controller 310.

The training device controller 310 controls a general operation of the training device 300, and analyzes the transmission data received through the wireless receiver 320.

Further, when it is determined that the identification code contained in the transmission data is the identification code of the corresponding GPS device 200, the training device controller 310 analyzes the intensity command code, and the vibration or the electrical stimulation generating command code contained in the transmission data and controls such that a vibration or an electrical stimulation having an intensity according to the intensity command code is generated.

FIG. 5 is a flowchart illustrating a process in which the position tracking apparatus for training the animal transfers transmission data for controlling a behavior of the animal to a training device through a GPS device according to embodiments of the present invention.

Referring to FIG. 5, when receiving the transmission data from the portable device 100 in step S501, the GPS device controller 210 analyzes the received transmission data in step S502.

At this time, it is preferable that the transmission data received from the portable device 100 contains the intensity command code, the vibration or the electrical stimulation generating command code, the code for requesting the position information, and the identification code of the GPS device 200.

The GPS device controller 210 extracts an intensity command code, and a vibration or an electrical stimulation generating command code corresponding to an operation command code of the training device 300 from codes contained in the transmission data received from the portable device 100 in step S503.

Further, the GPS device controller 210 extracts the identification code of the training device 300 pre-stored in step S504, and generates transmission data containing the intensity command code, the vibration or the electrical stimulation generating command code, and the identification code of the training device 300 in step S505.

Furthermore, the GPS device controller 210 transfers the generated transmission data to the training device 300 in step S506.

The training device 300 analyzes the intensity command code, and the vibration or the electrical stimulation generating command code contained in the transmission data received from the GPS device 200 and generates a vibration or an electrical stimulation having an intensity according to the intensity command code.

Accordingly, even if the animal is too far to receive the operation command of the training device 300, the user can operate the training device 300 attached to the body of the animal by using the portable device 100, and the portable device 100 can generate integrated data including all of the command codes for controlling the operation of the GPS device 200 and codes for controlling the operation of the training device 300 and transfer the generated integrated data to the GPS device 200 at a time.

The present invention has an effect of grasping a position of an animal through a GPS device and, when the animal acts with an undesirable behavior, training the animal to act desirably while grasping the position of the animal by applying an electrical stimulation or a vibration to the animal.

Further, the present invention has an effect of training the animal to recognize its undesirable behavior and to act desirably by applying an electrical stimulation or a vibration to the animal through the GPS device attached to the animal even though the animal is far away from the master.

While the detailed description of the present invention has described certain exemplary embodiments such as a portable terminal, it will be understood by those skilled in the art that various changes in form and details may be made therein without departing from the spirit and scope of the invention as defined by the appended claims.

What is claimed is:

1. A position tracking apparatus for training an animal, the position tracking apparatus comprising:
   a portable device for generating transmission data containing a vibration or an electrical stimulation intensity command code, a vibration or an electrical stimulation generating command code, and a code for requesting position information on an animal and transferring the transmission data;
   a GPS device for extracting the vibration or the electrical stimulation intensity command code and the vibration or the electrical stimulation generating command code from the transmission data received from the portable device, and generating transmission data containing an identification code of a training device, the GPS device being attached to a collar connected to a body of the animal and transferring the transmission data; and
   the training device for receiving the vibration or the electrical stimulation intensity command code and the vibration or the electrical stimulation generating command code from the GPS device through the transmission data, and generating a vibration or an electrical stimulation having an intensity according to a corresponding command, the training device being attached to the collar connected to the body of the animal and being located adjacent to the GPS device.

2. The position tracking apparatus as claimed in claim 1, wherein the portable device comprises:
   a key input unit comprising a vibration generating key for generating the vibration, an electrical stimulation generating key for generating the electrical stimulation, an intensity adjusting key for adjusting an intensity of the vibration or the electrical stimulation, and a GPS function controlling key for requesting position information of the animal;
   a portable device storage unit for storing a vibration generating command code according to an input of the vibration generating key, an electrical stimulation generating command code according to an input of the electrical stimulation generating key, a vibration or an electrical stimulation intensity command code according to an input of the intensity adjusting key, a position information requesting code according to an input of the GPS function controlling key, and a device identification code;
   a portable device controller for extracting a vibration or an electrical stimulation intensity command code, a vibration or an electrical stimulation command code, and a position information requesting code corresponding to a key input from the key input unit, extracting an identification code of the GPS device, and generating transmission data; and
   a wireless portable device transceiver for transmitting the transmission data generated through the portable device controller, and receiving transmission data containing position information of the animal.

3. The position tracking apparatus as claimed in claim 2, wherein the portable device further comprises:
   a portable device GPS module for performing communication with a GPS satellite and receiving coordinate data according to a position at regular intervals; and a display unit for displaying whether the vibration generating key or the electrical stimulation generating key is input and a size of an intensity input through the intensity adjusting key, and displaying distance information from the animal as a table and a map, wherein the portable device controller generates the distance information from the animal as the table and the map by using the position information of the animal received through the portable device wireless portable device transceiver and the coordinate data received from the portable device GPS module.

4. The position tracking apparatus as claimed in claim 1, wherein the GPS device comprises:

a GPS module for performing communication with a GPS satellite and receiving coordinate data according to a position at regular intervals;

a wireless transceiver for receiving transmission data containing an intensity command code, a vibration or an electrical stimulation generating command code, and a position information requesting code, and transmitting transmission data containing an intensity command code and a vibration or an electrical stimulation generating command code or transmission data containing position information according to the coordinate data;

a GPS device storage unit for storing an identification code of the portable device, an identification code of the GPS device, and an identification code of the training device;

a signal converter for extracting the intensity command code, the vibration or the electrical stimulation generating command code from the received transmission data, and generating transmission data containing the identification code of the training device; and a controller for controlling such that the coordinate data is transferred from the GPS module, the transmission data containing the position information is generated, and the generated transmission data is transferred to the portable device, and controlling the signal converter such that transmission data for an operation control of the training device is generated and transferred through the signal converter.

5. The position tracking apparatus as claimed in claim 1, wherein the training device comprises:

a vibration generator for generating a vibration, the vibration generator being in contact with the body of the animal;

an electrical stimulation generator for generating an electrical stimulation, the electrical stimulation generator being in contact with the body of the animal;

a wireless receiver for receiving the transmission data;

an LED output unit for turning on/off an LED according to whether the vibration generator or the electrical stimulation generator is operated; and a training device controller for controlling the vibration generator and the electrical stimulation generator such that a vibration or an electrical stimulation having an intensity according to a corresponding command is generated by analyzing the transmission data.

* * * * *